United States Patent
Dantin

(10) Patent No.: US 10,203,051 B2
(45) Date of Patent: Feb. 12, 2019

(54) "FLEXIBLE-RIGID" AIR PIPE

(71) Applicant: AIRBUS GROUP SAS, Blagnac (FR)

(72) Inventor: Benoit Dantin, Deuil la Barre (FR)

(73) Assignee: AIRBUS GROUP SAS (FR)

( * ) Notice: Subject to any disclaimer, the term of this patent is extended or adjusted under 35 U.S.C. 154(b) by 82 days.

(21) Appl. No.: 15/528,185

(22) PCT Filed: Nov. 19, 2015

(86) PCT No.: PCT/EP2015/077064
§ 371 (c)(1),
(2) Date: May 19, 2017

(87) PCT Pub. No.: WO2016/079226
PCT Pub. Date: May 26, 2016

(65) Prior Publication Data
US 2017/0328497 A1    Nov. 16, 2017

(30) Foreign Application Priority Data
Nov. 21, 2014  (FR) ...................................... 14 61288

(51) Int. Cl.
*F16L 9/12* (2006.01)
*F16L 11/10* (2006.01)
(Continued)

(52) U.S. Cl.
CPC .............. *F16L 11/10* (2013.01); *B64D 13/00* (2013.01); *F16L 11/02* (2013.01); *F16L 11/127* (2013.01);
(Continued)

(58) Field of Classification Search
CPC ... F16L 11/18; F16L 9/128; F16L 9/22; F16L 11/127; B64D 13/00; F24F 13/02
(Continued)

(56) References Cited

U.S. PATENT DOCUMENTS 5,871,117 A * 2/1999 Protasov ............... B29C 53/587
220/592
6,013,341 A * 1/2000 Medvedev ............... E04B 1/36
428/114
(Continued)

FOREIGN PATENT DOCUMENTS

EP    1589270    10/2005
EP    2339217    6/2011
(Continued)

OTHER PUBLICATIONS

International Search Report, International Application No. PCT/EP2015/077064, dated Jan. 25, 2016.

*Primary Examiner* — Patrick F Brinson
(74) *Attorney, Agent, or Firm* — Perman & Green, LLP

(57) ABSTRACT

A pipe for forming air flow pipelines in a structure that includes a flexible tube made from composite material, the tube having, on the length of same, sections for which the wall of the tube is stiffened by means of structural elements made from a rigid composite material incorporated into the wall of the tube. The structural elements are configured and arranged at the surface of the tube in such a way as to form a lattice framework surrounding the wall of the tube. The pipe further includes electrical conductors, disposed longitudinally on the wall of the pipe, the electrical conductors having a straight path at the stiffened sections of the pipe and a meandering path at certain of the non-stiffened sections of the pipe, the meandering allowing the conductor to tolerate the possible twisting of the pipe when it is installed in the structure.

11 Claims, 3 Drawing Sheets

(51) Int. Cl.
*B64D 13/00* (2006.01)
*F16L 11/127* (2006.01)
*F16L 11/18* (2006.01)
*F24F 13/02* (2006.01)
*F16L 11/02* (2006.01)
*B29D 23/00* (2006.01)
*B29K 75/00* (2006.01)
*B29K 83/00* (2006.01)
*B29K 309/08* (2006.01)
*B29L 23/00* (2006.01)

(52) U.S. Cl.
CPC ........... *F16L 11/18* (2013.01); *F24F 13/0218* (2013.01); *F24F 13/0254* (2013.01); *B29D 23/00* (2013.01); *B29K 2075/00* (2013.01); *B29K 2083/00* (2013.01); *B29K 2309/08* (2013.01); *B29L 2023/005* (2013.01); *Y02T 50/44* (2013.01)

(58) Field of Classification Search
USPC .................................. 138/172, 176, 177, 178
See application file for complete search history.

(56) References Cited

U.S. PATENT DOCUMENTS

| | | | |
|---|---|---|---|
| 8,181,580 B2* | 5/2012 | Roth | B65D 19/0073 108/57.25 |
| 8,585,753 B2* | 11/2013 | Scanlon | A61F 2/07 623/1.42 |
| 2013/0243989 A1* | 9/2013 | Ridges | B29C 53/566 428/36.91 |
| 2013/0291476 A1* | 11/2013 | Broughton, Jr. | E04C 3/28 52/653.2 |
| 2015/0056449 A1* | 2/2015 | Broughton, Jr. | E04C 3/28 428/376 |

FOREIGN PATENT DOCUMENTS

| | | |
|---|---|---|
| GB | 2442856 | 4/2008 |
| WO | 2012032397 | 3/2012 |

\* cited by examiner

"FLEXIBLE-RIGID" AIR PIPE

CROSS REFERENCE TO RELATED APPLICATIONS

This application is the National Stage of International Application No. PCT/EP2015/077064, having an International Filing Date of 19 Nov. 2015, which designated the United States of America, and which International Application was published under PCT Article 21(2) as WO Publication No. 2016/079226 A1, and which claims priority from, and the benefit of, French Application No. 1461288, filed on 21 Nov. 2014, the disclosures of which are incorporated herein by reference in their entireties.

BACKGROUND

1. Field

The disclosed embodiment relates to the general field of air-conditioning in aircraft and more particularly relates to the positioning of pipes, which are designed for the circulation of air, on the structure of the aircraft.

The disclosed embodiment also relates to the problems of positioning the various cable strands, which constitute the electrical cabling, on the structure of an aircraft.

2. Brief Description of Related Developments

As regards aircraft currently in service or in the course of assembly, the positioning of air-conditioning ducts which pass through the aircraft, in addition to the positioning of the cable strands which provide the electrical interconnections between the various items of electrical equipment in the aircraft, constitutes an awkward stage in the assembly of an aircraft.

Air is generally circulated in aircraft via rigid pipes made of a glass-fiber and phenolic resin composite connected together by coupling sleeves.

For obvious reasons of weight, these pipes have a very lightweight, fragile structure which makes their positioning particularly awkward and costly during the installation thereof. Moreover, their intrinsic fragility makes them vulnerable and results in frequent replacements, in particular during the operations of assembly and maintenance of the aircraft.

These pipes are, moreover, attached to the structure by means of supports fixed to the structural elements (primary structure, cladding, etc.), the positioning of the supports (surface preparation, bonding/riveting of the supports, drying cycle, etc.) being itself time-consuming.

The electrical interconnection between the items of equipment is itself currently implemented by means of electrical cables. These cables permit, for example, the transmission of high intensity currents, lower intensity operational currents, or electrical communication signals, in addition to the earthing of the various items of equipment.

These cables are also attached to the structure by means of supports fixed to structural elements (primary structure, cladding, etc.)

The positioning of the interconnection is also generally implemented by using prefabricated cable strands of specific dimensions which are not able to be easily reconfigured.

As in the case of air pipelines, the positioning of the supports (surface preparation, bonding/riveting of the supports, drying cycle, etc.) of the electrical interconnection is itself time-consuming.

Moreover, the spacing between the supports means that the electrical connections forming the interconnection cause the cabling to be lax, such that a separation distance between two adjacent connections is imposed by the regulations for installing systems so that two adjacent electrical connections are not able to come into contact with one another, due to the laxity of these connections between two fastenings.

As a result, the need to maintain the separation distances between different conductors means that according to the regulations which are currently applicable, the positioning of an interconnection requires a significant deployment volume which is not easily compatible with the architectures of current aircraft, where systems are being increasingly installed in technical spaces which are becoming smaller and smaller.

Thus, the necessity of reducing the installation time of the various items of equipment during the assembly of an aircraft and making the positioning of the electrical connection and air transport means compatible with the restrictions due to weight and space requirement results in the need to rethink carefully the structure of these means.

SUMMARY

One object of the disclosed embodiment is to propose a solution which is simple and effective to the problem set forth above.

To this end, the subject of the disclosed embodiment is a pipe for forming air flow pipelines in a structure. The pipe according to the disclosed embodiment comprises a flexible tube made from composite material, the matrix thereof being a resin which remains flexible after polymerization. Said tube has, on the length of same, sections for which the wall of the tube is stiffened by means of structural elements made from a composite material, the matrix thereof being a resin which is stiffened after polymerization. Said structural elements are configured and arranged on the surface of the tube in such a way as to form a lattice framework surrounding the wall of the tube.

According to various arrangements which are able to foe combined with one another, the device according to the disclosed embodiment also has various complementary features. Thus:

According to one particular aspect, the matrix forming the composite material which constitutes the tube is a polyurethane resin or a silicone resin.

According to one particular aspect, the matrix forming the composite material which constitutes the structural elements is an acrylic resin.

According to one particular aspect, the lattice framework made of rigid composite material which constitutes the rigid sections of the pipe is formed by rings connected together by longitudinal members arranged all around the wall of the tube.

According to one particular aspect, the pipe according to the disclosed embodiment further comprises structural elements in the form of rings, made of rigid composite material, arranged at the ends of the pipe.

According to one particular aspect, the lattice framework and the structural elements of the ends are integrated in the wall of the flexible tube before polymerization of the resins which constitute the flexible tube and the elements forming the framework.

According to one particular aspect, the reinforcing elements are integrated in the pipe before polymerization of the resins.

According to one particular aspect, the pipe according to the disclosed embodiment further comprises electrical conductors disposed longitudinally on the wall of the pipe, said electrical conductors having a straight path in the region of the stiffened sections of the pipe and a meandering path in the region of certain of the non-stiffened sections of the pipe.

According to one particular aspect, said electrical conductors have a meandering path in the region of the non-stiffened sections of the pipe, located at the ends of said pipe.

According to one particular aspect, said electrical conductors are integrated in the wall of the pipe before the polymerization of the resins.

According to one particular aspect, said electrical conductors are fixed to the wall of the pipe by means of an adhesive.

The disclosed embodiment advantageously permits the production of long pipes, comprising rigid parts which are able to be rapidly positioned and fixed to the structure and flexible parts permitting easier installation and dismantling.

Moreover, the possibility of producing, in one piece, pipelines of long length which are able to carry electrical connections advantageously permits the production of electrical connections of long length having a minimum number of connection zones. These zones are by nature disadvantageous to the operational behavior of the electrical systems by the addition of contact resistances and a reduction in the reliability of the connection in its entirety.

BRIEF DESCRIPTION OF THE DRAWINGS

The features and advantages of the disclosed embodiment will be understood more clearly by means of the following description which is based on the accompanying drawings, in which.

DETAILED DESCRIPTION

The remainder of the description discloses the disclosed embodiment via an exemplary aspect illustrated in the associated FIGS. 1 to 5. This example, which simply has the purpose of disclosing the features of the disclosed embodiment, naturally does not limit the scope or the extent thereof.

Figure 1:
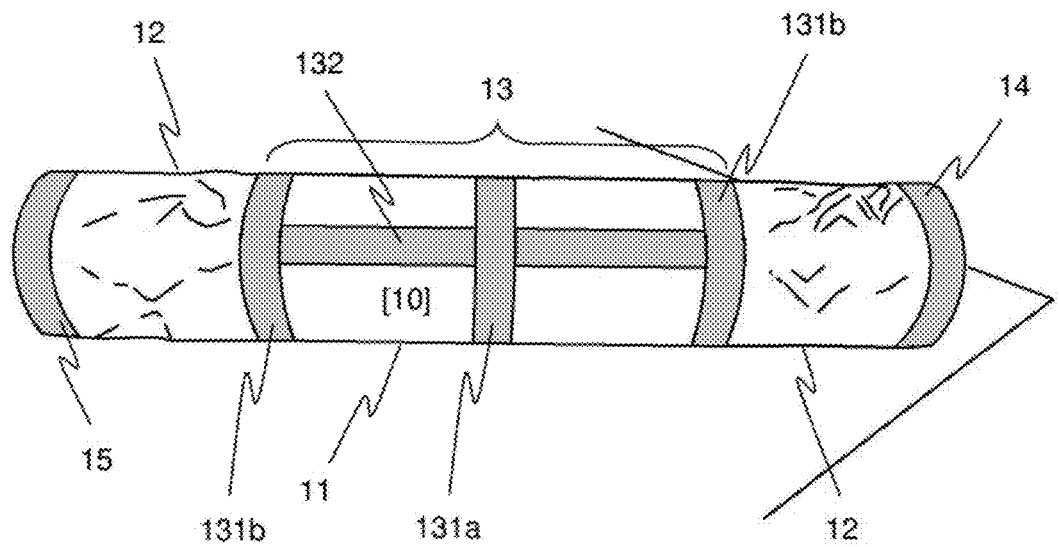
FIG. 1 shows an overall schematic view showing the structure of a pipe according to the disclosed embodiment.

As FIG. 1 illustrates, the device according to the disclosed embodiment principally consists of a pipe 10, an air-conditioning pipe designed to be housed in an aircraft structure, for example, alternately having rigid pipe sections 11 separated from one another by flexible pipe sections 12.

The respective lengths of the rigid sections 11 and the flexible sections 12 substantially depend on the use of the pipe under consideration and the circumstances of the positioning of this pipe.

According to the disclosed embodiment, this so-called "flexible-rigid" structure is obtained by producing a pipe made of composite material formed from a reinforced fabric impregnated with a resin which has the property of remaining flexible after polymerization.

In one particular aspect which is taken as a non-limiting example, the resin used is a polyurethane resin.

The flexible pipe 10 thus obtained is also stiffened over certain sections by structural elements 13, each element consisting of rings 131a and 131b made of composite material having a rigid matrix, arranged along the pipe 10 and connected together by longitudinal members 132 which are produced in composite material also having a rigid matrix, and arranged all around the wall of the pipe 10, preferably in a uniform manner.

The assembly consisting of the rings 131a and 131b connected together by longitudinal members 132 forms a framework 13 having the appearance of a frame or lattice surrounding certain sections of the pipe 10, in particular the central part, and making these sections incapable of flexion.

The pipe 10 according to the disclosed embodiment is thus able to consist of a succession of rigid parts 13 and flexible parts 12 such as those illustrated in FIG. 1.

The pipe 10 thus obtained is also stiffened at its ends by terminal elements 14, 15 in the form of rings produced from composite material having a rigid matrix, similar to the rings 131a and 131b which constitute the rigid structure 13. These rings, of specific widths, have the function of facilitating the connection of two pipes, for example, permitting a rigid connecting tube 31 to be easily inserted at the end of each of the pipes as illustrated in FIG. 3.

Figure 2:
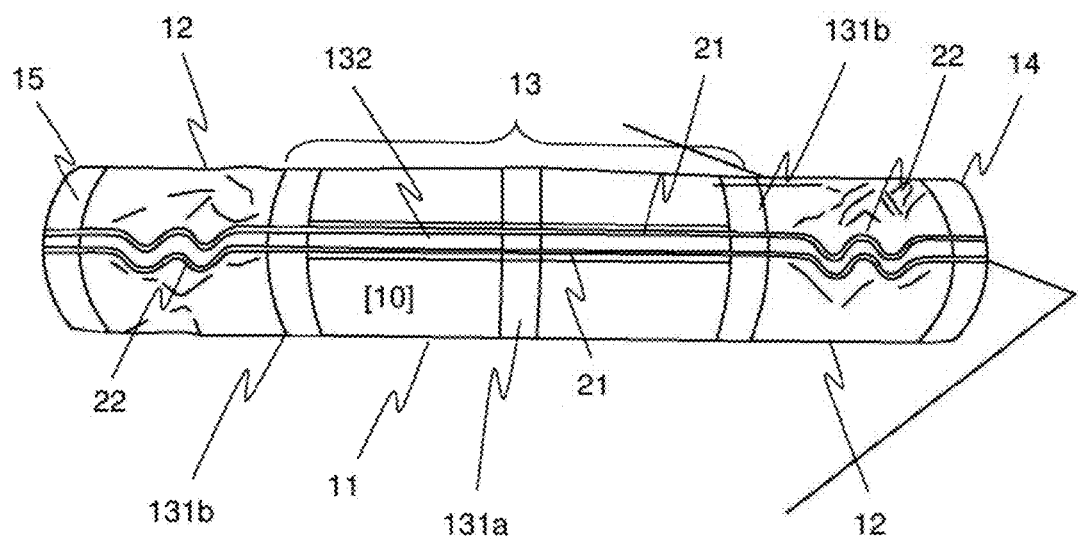
FIG. 2 shows an overall schematic view of a pipe according to the disclosed embodiment provided with conductor elements.
Figure 3:
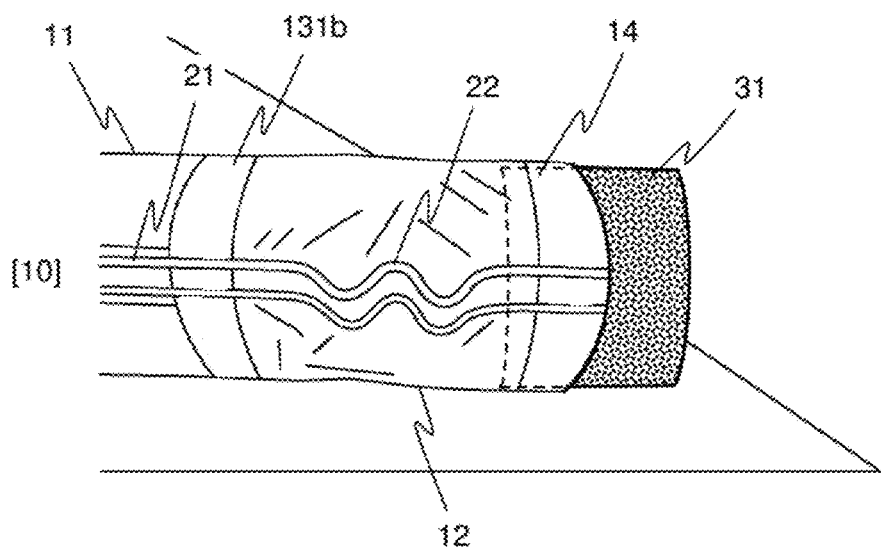
FIG. 3 shows a partial schematic view of the pipe according to the disclosed embodiment shown in FIG. 3.

Depending on whether the terminal section of the pipe under consideration is kept flexible or rigid, a terminal ring may be placed at the end of a section of the pipe 10 which is kept flexible, as illustrated in FIGS. 1 to 3, or may constitute the terminal ring 131b of a rigid section.

Optionally, the pipe 10 may also comprise intermediate structures 14 and 15 in the form of rings produced from composite material having a rigid matrix, similar to the rings 131a and 131b constituting the rigid structure 13 but without a rigid link between one another or therewith. These intermediate rigid rings 14 and 15 may, in particular, facilitate the connection between two pipes having flexible ends of pipe sections which are kept flexible.

The "flexible-rigid" pipe structure according to the disclosed embodiment may be produced in a composite material in different ways which are known and not disclosed here.

For the production of "flexible-rigid" pipes, for example, it is possible to use a glass-fiber fabric woven in coarse mesh and a resin which remains flexible after polymerization (polyurethane, silicone, etc.) for the flexible parts, and a standard woven glass fabric with a resin which is rigid after polymerization, an epoxy resin for example.

However, in a preferred aspect the pipe 10 according to the disclosed embodiment is produced in a single operation which consists in forming a tube from woven glass-fiber fabric impregnated with a flexible resin and in constituting the rigid framework on the external wall of the tube thus formed by applying to the external surface of the tube strips of fabric impregnated with a rigid matrix, the strips of impregnated fabric being arranged so as to constitute the rings 131a and 131b and the longitudinal members 132 forming a framework element 13 or the terminal rings 14 and 15 of the pipe.

The assembly thus formed is then polymerized in a single operation such that the pipe 10 obtained forms an object in one piece, i.e. without any element attached after-manufacture, by bonding or any other known technique.

According to this preferred aspect, the epoxy resin used to form the framework elements 13 is selected so that its polymerization is carried out in the same conditions as those of the polyurethane used to produce the pipe 10.

Figure 4:
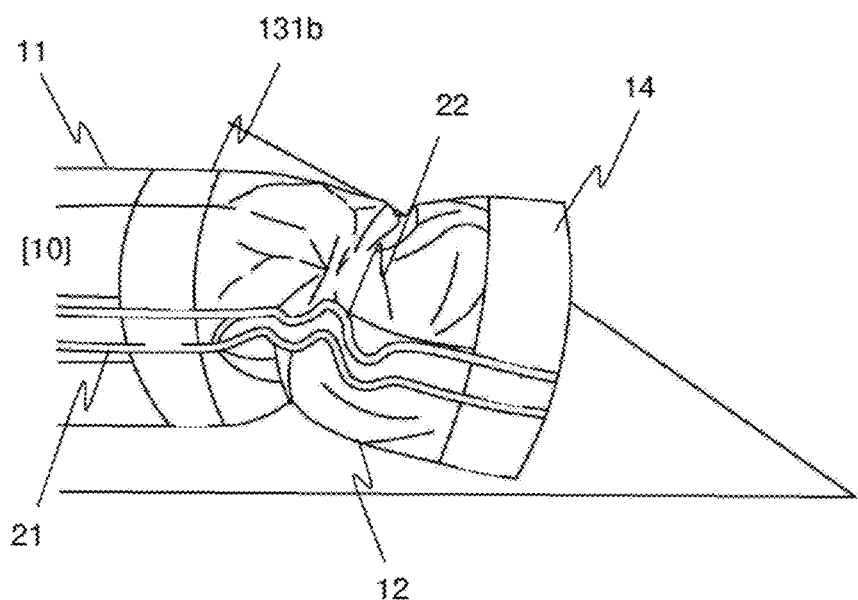
FIG. 4 shows a partial schematic view of the pipe according to the disclosed embodiment shown in FIG. 3, the end of the element of the pipe being folded.
Figure 5:
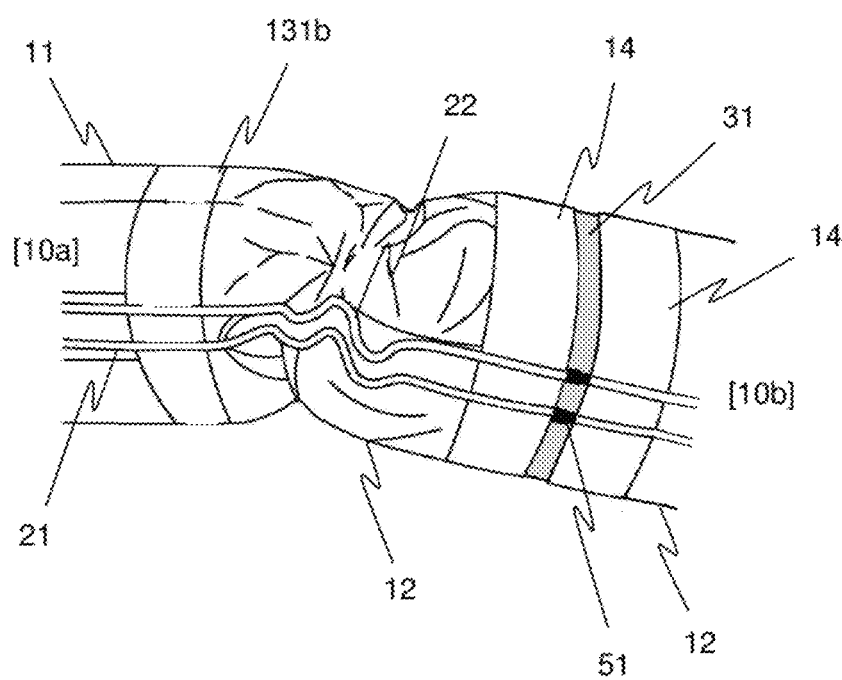
FIG. 5 shows a partial schematic view of a pipe 10a according to the disclosed embodiment shown in FIG. 3, said end being connected to a further pipe 10b.

Advantageously, as FIGS. 4 and 5 illustrate, this "flexible-rigid" structure permits the arrangement of a single pipe which has rigid straight sections 11 and flexible sections 12 capable of being deformed without damage, permitting the production in one piece of pipes 10 of long length (of several meters) which are easy to position inside the structure for which they are destined.

The rigid parts 11 permit easy handling of the pipe 10 under consideration, the installation of said pipe on the structure and the easy connection of the different pipes forming a pipeline.

The flexible parts 12, in turn, facilitate the mounting and dismantling of pipes in congested areas and the take-up of geometric variations in the assembly of the structures on which they are installed. They permit, in particular, the pipe 10 under consideration to have bent portions to follow the desired path. The bent portions are thus produced without requiring the interruption of the pipe or the positioning of a rigid bent element. Thus it is possible to produce, with a minimum of joints 31, pipelines of long length having both straight and bent portions.

In one particular aspect, illustrated by FIGS. 2 to 5, the pipe 10, according to the disclosed embodiment, may be provided with electrical conductors 21 (cables, braids, etc.) arranged so as to run longitudinally along the pipe 10. To this end, said conductors 21 may be directly bonded to the surface of the pipe 10 after the manufacture thereof.

Alternatively, said conductors may be integrated, before polymerization, in the matrix impregnating the composite material such that after polymerization they form an integral part of the wall of the pipe 10. The conductors 21 are preferably arranged so as to pass over the longitudinal members 132, each constituting frameworks 13 forming the rigid sections 11 of the pipe 10.

According to the disclosed embodiment, the conductors 21 are arranged on the pipe 10 so as not to impair the capacity for deformation which the pipe 10 has in the region of the sections 12 which are kept flexible. To this end, said conductors adopt in these zones an undulating path 22 as illustrated in FIGS. 2 and 3. This undulating path advantageously enables a deformation of the straight profile of the pipe 10 in the region of the flexible sections 12, as illustrated by FIGS. 4 and 5, without the conductors 21 being ruptured or being torn off from the surface of the pipe 10 and at the same time damaging the wall thereof. Thus, it is advantageously possible to connect two pipes 10a and 10b oriented in different directions, as illustrated in FIG. 5, by means of a simple straight coupling sleeve 31.

It should be mentioned that, due to the lower number of joints required to form a pipeline of a given length, the path of the electrical connections along the pipeline under consideration requires a lower number of connecting devices 51 such that the electrical losses (i.e. joules associated with the electrical resistance, in particular) caused by the connections are lower and the risks of breaking these electrical connections by the interruption of these connections are minimal.

The use of "flexible-rigid" pipes according to the disclosed embodiment thus achieves several advantages:

a. it permits the grouped installation of the air pipes and electrical networks which causes a reduction in the workload of the personnel entrusted with the installation of this equipment and the cycle time required for the installation of the electrical systems (elimination of the positioning of supports for the electrical connections).

b. it enables an increase in the compactness of the electrical connections, the conductor elements being directly integrated in the surface of the air pipelines (no separation distances to be maintained);

c. it leads to a reduction in the weight of electrical connections by the elimination of the supports required for the retention thereof in the aircraft;

d. it introduces a certain tolerance to damage to the air pipes which in the case of impact, associated with dropping a tool for example, are now able to be deformed instead of being damaged. The flexibility of the "flexible-rigid" pipes make said pipes more robust, the use thereof thus advantageously leading to a reduction in maintenance costs.

What is claimed is:

1. A pipe for forming air flow pipelines in a structure, comprising a flexible tube made from composite material, a matrix thereof being a resin which remains flexible after polymerization, said tube having, along its length, sections for which the wall of the tube is stiffened by means of a structural elements made from a composite material, a matrix thereof being a resin which is stiffened after polymerization, said structural elements being configured and arranged on the surface of the tube in such a way as to form a lattice framework surrounding the wall of the tube.

2. The device as claimed in claim 1, wherein the matrix forming the composite material which constitutes the tube is a polyurethane resin or silicone resin.

3. The device as claimed in claim 1, wherein the matrix forming the composite material which constitutes the structural elements is an acrylic resin.

4. The device as claimed in claim 1, wherein the lattice framework made of rigid composite material which constitutes the rigid sections of the pipe is formed from rings connected to one another by longitudinal members arranged all around the wall of the tube.

5. The device as claimed in claim 1, further comprising structural elements in the form of rings, made of rigid composite material, arranged at the ends of the pipe.

6. The device as claimed in claim 1, wherein the lattice framework and the structural elements of the ends are integrated in the wall of the flexible tube before polymerization of the resins which constitute the flexible tube and the elements forming the framework.

7. The devices as claimed in claim 6, wherein the reinforcing elements are integrated in the pipe before polymerization of the resins.

8. The device as claimed in claim 1, further comprising electrical conductors disposed longitudinally on the wall of the pipe, said electrical conductors having a straight path in the region of the stiffened sections of the pipe and a meandering path in the region of certain of the non-stiffened sections of the pipe.

9. The device as claimed in claim 8, wherein said electrical conductors have a meandering path in the region of the non-stiffened sections of the pipe located at the ends of said pipe.

10. The device as claimed in claim 8, wherein said electrical conductors are integrated in the wall of the pipe before the polymerization of the resins.

11. The device as claimed in claim 8, wherein said electrical conductors are fixed to the wall of the pipe by means of an adhesive.

\* \* \* \* \*